United States Patent [19]
Mishima et al.

[11] Patent Number: 5,302,665
[45] Date of Patent: Apr. 12, 1994

[54] STYRENE OR VINYL CHLORIDE RESIN WITH GLYCIDYL(OXY)/AMIDO-MODIFIED POLYOLEFIN

[75] Inventors: Ikuhiro Mishima, Hyogo; Yoshihiko Hashimoto, Osaka; Kazuhiko Tamai; Hisataka Hayashi, both of Hyogo, all of Japan

[73] Assignee: Kanegafuchi Kagaku Kabushiki Kaisha, Osaka, Japan

[21] Appl. No.: 911,099

[22] Filed: Jul. 9, 1992

[30] Foreign Application Priority Data

Jul. 12, 1991 [JP] Japan ................... 3-198722

[51] Int. Cl.$^5$ .................... C08L 51/04; C08L 51/06
[52] U.S. Cl. ........................... 525/71; 525/77; 525/78; 525/79; 525/80; 525/83; 525/84; 525/85
[58] Field of Search ............ 525/77, 80, 71, 83, 525/84, 85, 78, 79

[56] References Cited
PUBLICATIONS

Chemical abstract No. 118:22821a, Tamai et al, "Vinyl Polymers and Their Preparation," Vol. 118, No. 4, 1992.

*Primary Examiner*—Robert E. Sellers
*Attorney, Agent, or Firm*—Armstrong, Westerman, Hattori, McLeland & Naughton

[57] ABSTRACT

A thermoplastic resin composition contains from 5 to 98 parts by weight of a styrene resin (A) and/or a vinyl chloride resin (B) and from 95 to 2 parts by weight of a modified olefin polymer (C) having, per from 2 to 1,000 olefin-derived repeating units, one structural unit containing at least one amido group (a) and at least one reactive group (b) selected from glycidyloxy group and glycidyl group. The composition can be used for producing shaped articles required to have high strength such as interior automotive parts, housings for office appliances, various machine parts, and electrical or electronic parts.

8 Claims, No Drawings

STYRENE OR VINYL CHLORIDE RESIN WITH GLYCIDYL(OXY)/AMIDO-MODIFIED POLYOLEFIN

FIELD OF THE INVENTION

The present invention relates to a novel thermoplastic resin composition which gives shaped articles having excellent mechanical strength.

BACKGROUND OF THE INVENTION

Recently, resin modifications are extensively studied which are based on the technique of alloying two or more polymers having different properties.

For example, known methods for modifying a resin blend comprising a styrene resin or vinyl chloride resin and an olefin resin include alloying the resin blend with an ethylene-vinyl acetate copolymer (JP-B-60-36178) and alloying the resin blend with a compound modified with an ethylene-propylene-diene copolymer (EPDM) (JP-A-63-304039 and JP-A-1-165640). (The terms "JP-B" and "JP-A" as used herein mean an "examined Japanese patent publication" and an "unexamined published Japanese patent application", respectively.)

However, there has been a problem that these conventional techniques are able to produce only resins insufficient in mechanical strength such as impact resistance.

SUMMARY OF THE INVENTION

The present inventors have made intensive studies in order to overcome the above problem. As a result, it has now been found that when a resin comprising a blend of a styrene resin and/or a vinyl chloride resin with an olefin resin is modified with an olefin polymer modified with a specific compound, the mechanical strength of the resin is improved. The present invention has been completed based on this finding.

Accordingly, an object of the present invention is to provide a thermoplastic resin composition having excellent mechanical properties.

The present invention provides a thermoplastic resin composition comprising from 5 to 98 parts by weight of a styrene resin (A) and/or a vinyl chloride resin (B) and from 95 to 2 parts by weight of a modified olefin polymer (C) having, per from 2 to 1,000 olefin-derived repeating units, one structural unit containing at least one amido group (a) and at least one reactive group (b) selected from the group consisting of glycidyloxy group and glycidyl group.

DETAILED DESCRIPTION OF THE INVENTION

In the composition of the present invention, the olefin polymer modified with a specific compound is an essential component for imparting improved mechanical strength to the composition thereby to realize the object of the invention.

The modified olefin polymer employed in the present invention has, per from 2 to 1,000 olefin-derived repeating units, one structural unit containing at least one amido group and at least one reactive group selected from the group consisting of glycidyloxy group and glycidyl group.

Such a modified olefin polymer can be produced by copolymerizing an olefin with a compound which has a reactive group, e.g., vinyl group, polymerizable with olefins and also has both at least one amido group and at least one glycidyl group and/or glycidyloxy group. Alternatively, the modified olefin polymer may be produced by a process in which a polyolefin is first prepared by an ordinary polymerization method and the above-described modifying compound, i.e., a compound having a reactive group, e.g., vinyl group, polymerizable with olefins and also having both at least one amido group and at least one glycidyl group and/or glycidyloxy group, is then incorporated into the polyolefin chain by ordinary graft polymerization. When the above-described modifying compound, such as those represented by general formula (I) described below, is copolymerized with an olefin or graft-polymerized with a polyolefin, a polymerizable vinyl monomer other than the modifying compound may be copolymerized.

Examples of the modified olefin polymer include olefin polymers modified with compounds represented by the following general formula (I):

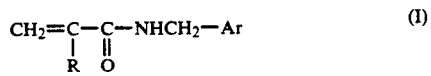

(wherein Ar represents a $C_6$–$C_{23}$ aromatic hydrocarbon group having at least one reactive group selected from the group consisting of glycidyloxy group and glycidyl group, and R represents hydrogen atom or methyl group).

More specifically, a preferred example of the modified olefin polymer employed in the present invention is a modified olefin resin obtained by the copolymerization of a compound of general formula (I) given above with an olefin polymer and having, per from 2 to 1,000 olefin-derived repeating units, one structural unit containing a glycidyl group and represented by the following general formula (II):

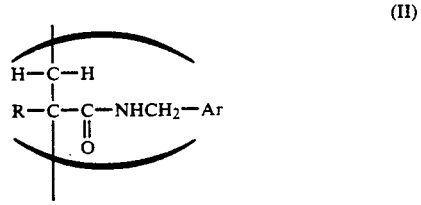

(wherein Ar represents a $C_6$–$C_{23}$ aromatic hydrocarbon group having at least one reactive group selected from the group consisting of glycidyloxy group and glycidyl group, and R represents hydrogen atom or methyl group).

The compound represented by general formula (I)

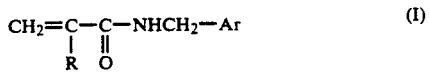

(wherein Ar represents a $C_6$–$C_{23}$ aromatic hydrocarbon group having at least one reactive group selected from the group consisting of glycidyloxy group and glycidyl group, and R represents hydrogen atom or methyl group) can be produced, for example, by the method described in JP-A-60-130580.

That is, a compound represented by the following general formula (III):

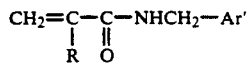

$$CH_2=C-C-NHCH_2-Ar' \quad \text{(III)}$$
$$\phantom{CH_2=C}|\phantom{-C}\|$$
$$\phantom{CH_2=C}R\phantom{-}O$$

(wherein Ar' represents a $C_6$–$C_{23}$ aromatic hydrocarbon group having at least one hydroxyl group and R represents hydrogen atom or methyl group) is addition-reacted with an epihalohydrin, and the resulting adduct is subjected to dehydrohalogenation with an alkali, thereby producing a compound of general formula (I).

In the case of using 2,6-xylenol-N-methylolacrylamide, for example, as a starting material, a compound shown by the following structural formula (IV) can be obtained.

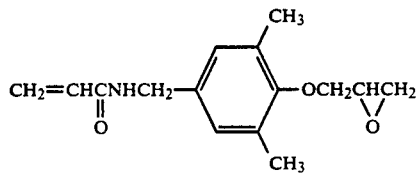

Methods for producing a copolymer of an olefin polymer with a compound of general formula (I) are not particularly limited, but the following two processes can be utilized advantageously.

The first process comprises modifying an olefin polymer by grafting, while the second process comprises copolymerizing an olefin monomer with a glycidyl group-containing compound represented by general formula (I) given above.

In the first process which is for olefin polymer modification by grafting, a composition comprising an olefin polymer (D) and a glycidyl group-containing compound (E) represented by general formula (I)

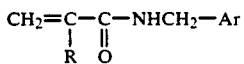

(wherein Ar and R are as defined hereinabove) is mixed with a free-radical initiator (F) to thereby allow ingredients (D) and (E) to undergo radical addition.

In this process, a solvent capable of dissolving or swelling the olefin polymer, such as, for example, tetralin, decalin, toluene, xylene, or chlorobenzene, may be used.

The first process may, for example, be carried out by melt-mixing an olefin resin and a compound of general formula (I) together with a free-radical initiator, using any of conventionally known blenders such as an extruder, heated rolls, Brabender, Banbury mixer, and the like.

In the second process, an olefin monomer is copolymerized with a glycidyl group-containing compound represented by general formula (I) given above.

Methods for the copolymerization are not particularly limited, and the copolymerization may, for example, be conducted by an ordinary polymerization technique, such as radical polymerization, cationic polymerization, or anionic polymerization, or by means of coordination polymerization using a transition metal.

The modified olefin polymer produced, for example, by the radical addition of a compound of general formula (I) to an olefin polymer or by the copolymerization of an olefin monomer with a compound of general formula (I), as described above, may be any of a random copolymer, graft copolymer, block copolymer, and other copolymers of the olefin and the compound of general formula (I). It is, however, preferred that the modified olefin polymer should have one structural unit containing a glycidyl group and represented by the following formula (II):

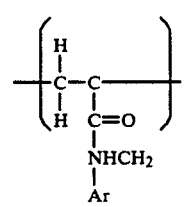

(wherein Ar represents a $C_6$–$C_{23}$ aromatic hydrocarbon group having at least one reactive group selected from the group consisting of glycidyloxy group and glycidyl group, and R represents hydrogen atom or methyl group), per from 2 to 1,000 olefin-derived repeating units.

If the copolymerized amount of the compound of general formula (I) is too small and the modified olefin polymer contains one structural unit of general formula (II) per more than 1,000 olefin-derived repeating units, the olefin polymer has been insufficiently modified and this modification product, when blended with a styrene resin and/or a vinyl chloride resin, cannot sufficiently improve the mechanical strength of the resin(s).

Examples of the olefin polymer as a raw material for the modified olefin polymer to be employed in the present invention include homopolymers of various olefin monomers, random, block, or graft copolymers thereof, and mixtures of these homopolymers or copolymers. Specific examples thereof include olefin polymers or oligomers such as polyethylenes, e.g., high-density polyethylene, medium-density polyethylene, and low-density polyethylene, polypropylene, copolymers of ethylene and an α-olefin, copolymers of propylene and an α-olefin, polybutene, polypentene, and poly(4-methylpentene-1) and olefin-based elastomers such as ethylene-propylene rubbers, ethylene-propylene-diene rubbers, ethylene-vinyl acetate copolymers, butyl rubber, butadiene rubber, propylene-butene copolymers, and ethylene-acrylate copolymers. These may be used alone or in combination of two or more thereof.

The styrene resin and/or vinyl chloride resin which is to be improved in mechanical strength according to the present invention may be a styrene resin alone, such as those enumerated below, or a vinyl chloride resin alone, such as those enumerated later, or an alloy consisting of both resins.

Examples of the styrene resin include acrylonitrile-butadiene-styrene copolymers (ABS resins), acrylonitrile-styrene resins (AS resins), methyl methacrylate-acrylonitrile-butadiene-styrene resins (MABS resins), methyl methacrylate-butadiene-styrene copolymers (MBS resins), acrylonitrile-alkyl acrylate-styrene copolymers (AAS resins), acrylonitrile-ethylenepropylene-styrene copolymers (AES resins), acrylonitrile-butadiene-styrene-α-methylstyrene copolymers, acrylonitrile-methyl methacrylate-butadiene-styrene-α-methylstyrene copolymers, polystyrene, styrene-α-methylstyrene copolymers, styrene-butadiene resins (HIPS resins), styrene-methyl methacrylate copolymers, styrene-maleic anhydride copolymers, styrene-maleimide copolymers, styrene-(N-substituted maleimide) copolymers, acrylonitrilebutadiene-styrene-β-isopropenylnaphthalene copolymers, and acrylonitrilemethyl methacrylate-butadiene-styrene-α-methylstyrene-maleimide copolymers. These may be used alone or in combination of two or more thereof.

As the styrene resin, any of various kinds of improved styrene resins may be used in order to improve processability or mechanical strength. For example, there are cases where a low-molecular styrene resin is used in order to improve formability, while there are cases where a styrene resin comprising a styrene copolymer containing a monomer unit derived from a vinyl cyanide compound or alkyl methacrylate compound is used in order to improve mechanical strength.

Further, there are cases where a styrene resin or vinyl chloride resin containing a functional group which readily reacts with an epoxy group of the above-described modified olefin polymer, such as the functional groups contained in organic acids, e.g., carboxylic acids, organic acid anhydrides, e.g., carboxylic anhydrides, organic acid salts, e.g., carboxylic acid salts, esters, alcohols, amines, amides, imides, etc., are used in order to further improve mechanical strength.

In the case where the styrene resin to be employed in the present invention comprises a styrene copolymer containing a monomer unit derived from a vinyl cyanide compound and/or an alkyl methacrylate compound, it is preferred that the monomer unit derived from a vinyl cyanide compound and/or an alkyl methacrylate compound comprises from 10 to 60% by weight of the copolymer. If the content of the monomer unit derived from a vinyl cyanide compound and/or alkyl methacrylate compound is below 10% by weight, the composition obtained using the styrene resin is apt to have impaired chemical resistance. If the content thereof exceeds 60% by weight, the composition is apt to have impaired flowability, resulting in a difficulty in shaping the composition.

In the case where the composition of the present invention is required to have impact resistance, a styrene resin containing from 0 to 70 parts by weight of a graft copolymer per 100 parts by weight of the styrene resin obtained by polymerizing from 40 to 90% by weight of a rubbery polymer with from 60 to 10% by weight of a mixture of at least one compound selected from the group consisting of a vinyl cyanide compound, an aromatic vinyl compound, and an alkyl methacrylate and a monomer copolymerizable with these compounds can be advantageously used as the styrene resin to be blended with the modified olefin polymer.

Examples of the rubber-like polymer include ethylene-propylene rubbers (EPR), ethylene-propylene-diene rubbers (EPDM), polybutadiene rubber, styrene-butadiene rubbers (SBR), acrylonitrile-butadiene rubbers (NBR), and butyl acrylate-butadiene rubbers. These rubber-like polymers may be used alone or in combination of two or more thereof.

Examples of the vinyl cyanide compound include acrylonitrile and methacrylonitrile. Examples of the aromatic vinyl compound include styrene, methylstyrene, chlorostyrene, and α-methylstyrene. Examples of the alkyl methacrylate include methyl methacrylate and ethyl methacrylate. These compounds may be used alone or in combination of two or more thereof.

It is preferred, from a processability standpoint, that the styrene resin be one whose methyl ethyl ketone-soluble part has a reduced viscosity of from 0.2 to 1.2 dl/g (dimethylformamide solution, 30° C., concentration 0.3 g/dl). If the reduced viscosity of the methyl ethyl ketone-soluble part of the styrene resin is below 0.2 dl/g, the composition obtained using the styrene resin is apt to have impaired mechanical strength. If the reduced viscosity thereof exceeds 1.2 dl/g, the composition is apt to have impaired flowability, resulting in a difficulty in shaping the composition.

Styrene resins satisfying the reduced viscosity requirement described above can be produced by an ordinary method in which polymerization is conducted in the presence of a polymerization degree regulator such as n-dodecylmercaptan, t-dodecylmercaptan, or the like.

The vinyl chloride resin is not limited to vinyl chloride homopolymer and may be a copolymer of vinyl chloride and one or more monovinylidene compounds, e.g., ethylene, vinyl acetate, methyl methacrylate, and butyl acrylate, as long as the vinyl chloride unit content in the copolymer is 80% by weight or more and the content of monomer units derived from such comonomer compounds is 20% by weight or less. Further, the vinyl chloride resin may be a resin obtained by chlorinating a vinyl chloride resin having a vinyl chloride unit content of 80% by weight or more. These vinyl chloride resins may be used alone or in combination of two or more thereof.

It is preferred that the vinyl chloride resin have an average polymerization degree in the range of from 400 to 2,000, with the more preferred range thereof being from 450 to 1,500. If the average polymerization degree of the vinyl chloride resin is below 400, the composition obtained using the resin has impaired impact strength. If the average polymerization degree thereof exceeds 2,000, the composition disadvantageously shows very poor flowability.

The thermoplastic resin composition of the present invention comprises from 95 to 2% by weight of the modified olefin polymer and from 5 to 98% by weight of the sum of the styrene resin and/or vinyl chloride resin. Preferably, the resin composition comprises from 90 to 10% by weight of the former and from 10 to 90% by weight of the latter.

If the amount of the modified olefin polymer is below 2% by weight, the effect of improving mechanical strength is not produced. If the amount thereof exceeds 95% by weight, properties of the styrene resin or vinyl chloride resin are lost. In the case where the composition of the present invention contains both a styrene resin and a vinyl chloride resin, the proportion of the former to the latter resin preferably is from 10/90 to 90/10.

There are cases where a modified olefin polymer of the above-described kind is used as a modifier such as a compatibility improver. In this case, an olefin polymer that has not been modified with a compound of general formula (I) may be blended with a thermoplastic resin comprising the modified olefin polymer and a styrene resin and/or vinyl chloride resin in an amount up to 100 times the amount of the modified olefin polymer.

If required and necessary, various additives may be incorporated into the thermoplastic resin composition of the present invention thereby imparting thereto functions not originally possessed by the composition. Examples of the additives include ordinarily well known ones such as antioxidation agents, heat stabilizers, and lubricants, and further include ultraviolet absorbers, pigments, antistatic agents, flame retardants, flameretardant aids, and reinforcing fibers. Specifically, for example, phenolic-type antioxidants and phosphite-type stabilizers for use with styrene resins and olefin resins and tin-containing stabilizers and internal or external lubricants, such as various kinds of fatty acid esters, metal soaps, and waxes, for use with vinyl chloride resins may be incorporated in order to enable the thermoplastic resin composition of the present invention to be used as a molding resin having higher performances.

From the thermoplastic resin composition of the present invention, desired shaped articles can be obtained by using any of various shaping techniques by which ordinary thermoplastic resins are shaped, such as injection molding, extrusion, blow molding, and compression molding. Since the thermoplastic resin composition has excellent mechanical properties, it can be advantageously used for producing shaped articles required to have high strength, such as, for example, interior automotive parts, housings for office appliances, various machine parts, and electrical or electronic parts.

The present invention will be illustrated in more detail with reference to the following examples, but the invention is not construed as being limited thereto.

REFERENCE EXAMPLE (1) Production of Modified Olefin Polymer (C1)

100 Parts by weight of an olefin polymer (C2) (polypropylene; AH561, manufactured by Union Polymer Corp., Japan) was dry blended with 100 parts by weight of the compound of structural formula (IV) given hereinabove and 0.1 part by weight of $\alpha,\alpha'$-(t-butylperoxy-m-isopropyl)benzene (Perbutel P, manufactured by Nippon Oil & Fats Co., Ltd., Japan). This blend was fed to a 44-mm, same direction-rotating twin-screw extruder (TEX 44, manufactured by The Japan Steel Works, Ltd.) at a rate of 9 kg/hr, while the temperature of the extruder was regulated at 210° C. The extrudate was cooled with water, pelletized, and then dried at 70° C. for 12 hours under a reduced pressure. The dry pellets thus obtained were pulverized and then washed with acetone 5 times to remove the compound of structural formula (IV) remaining unreacted and homopolymer of the compound, thereby obtaining a modified polypropylene. The amount of the compound of structural formula (IV) grafted onto the polypropylene was determined from an infrared spectrum of the modified polypropylene and from elemental analysis data for determining the nitrogen atom content of the modified polypropylene. As a result, the grafted compound (IV) amount was found to be 37.1% by weight.

This modified olefin polymer (C1) had one structural unit derived from the compound of structural formula (IV), per 11 olefin-derived repeating units.

EXAMPLE 1

In a nitrogen stream, 250 parts by weight of water, 3 parts by weight of sodium laurate, 0.01 part by weight of disodium ethylenediaminetetraacetate, and 0.0025 part by weight of ferrous sulfate were introduced into a reactor equipped with a stirrer and a condenser. The mixture in the reactor was heated to 60° C. with stirring, and a monomer mixture consisting of 10 parts by weight of styrene, 25 parts by weight of acrylonitrile, and 65 parts by weight of $\alpha$-methylstyrene was then continuously added dropwise over a period of 5 hours along with cumene hydroperoxide as an initiator and t-dodecylmercaptan as a polymerization controlling agent. After completion of the dropwise addition, stirring of the reaction mixture was further continued for another 1 hour at 60° C., thereby completing polymerization. On the other hand, polymerization was separately conducted in the same manner as in the above except that 60 parts by weight of polybutadiene rubber was introduced before a monomer mixture consisting of 30 parts by weight of styrene and 10 parts by weight of acrylonitrile was added dropwise in place of the monomer mixture used above. The two kinds of latexes thus obtained were mixed together in a ratio of 2.5:1. The resin particles in the resulting latex mixture were coagulated by salting out, washed with water, subsequently dehydrated, and then dried, thereby obtaining a powder of a styrene resin (A1).

50 Parts by weight of styrene resin (A1) which had been obtained through the above-described emulsion polymerizations and properties of MEK-soluble part of which are shown in Table 1 was blended with 50 parts by weight of modified olefin polymer (C1) using a 20 l Henschel mixer, and the blend was pelletized with a twin-screw extruder, thereby obtaining pellets of a thermoplastic resin composition according to the present invention.

EXAMPLE 5 AND COMPARATIVE EXAMPLES 1 AND 5

A styrene resin (A1) was synthesized in the same manner as in Example 1, properties of the MEK-soluble part of the resin being shown in Table 1.

TABLE 1

| | Styrene Resin (A) | |
|---|---|---|
| | A1 | A2 |
| Property of MEK-soluble part AN* content (%) | 30 | 25 |
| Reduced viscosity | 0.62 | 0.36 |

*AN means acrylonitrile

According to the formulations shown in Table 3, styrene resin (A1) was blended with either modified olefin polymer (C1) or unmodified olefin polymer (C2) in the same manner as in Example 1, thereby obtaining pellets of thermoplastic resin compositions.

EXAMPLE 2

50 Parts by weight each of vinyl chloride resins (B1) (trade name, Kanevinyl S-1007) and (B2) (trade name, Kanevinyl H-0165, heat-resistive), both of which were manufactured by Kanegafuchi Kagaku Kogyo K.K., Japan and had been obtained by a known suspension polymerization method and properties of which are shown in Table 2, was blended with 50 parts by weight of modified olefin polymer (C1), 2 parts by weight of dibutyltin maleate (trade name, Stann RC-5Z; manufactured by Sankyo Organic Chemicals Co., Ltd., Japan) as a stabilizer, and 2 parts by weight of polyethylene wax (trade name, High-Wax; manufactured by Mitsui Petrochemical Co., Ltd., Japan) as a lubricant, using a 10 l Henschel mixer. The blend was pelletized with a twin-screw extruder, thereby obtaining pellets of a thermoplastic resin composition according to the present invention.

TABLE 2

| | Vinyl Chloride Resin (B) | |
|---|---|---|
| | B1 | B2 |
| Polymerization degree | 700 | 700 |

TABLE 2-continued

| | Vinyl Chloride Resin (B) | |
|---|---|---|
| | B1 | B2 |
| Cl content* (%) | 56 | 60 |

*Chlorine atom amount (wt %) in the vinyl chloride resin.

EXAMPLES 3 AND 4 AND COMPARATIVE EXAMPLES 2 TO 4

A styrene resin (A2) was synthesized in the same manner as in Example 1, properties of the MEK-soluble part of the resin being shown in Table 1. Using this styrene resin (A2), vinyl chloride resins (B1) and (B2), modified olefin polymer (C1), and unmodified olefin polymer (C2), pelletized thermoplastic resin compositions were obtained in the same manner as in Example 2 according to the formulations shown in Table 3.

TABLE 3

| | Formulation for Thermoplastic Resin Composition | | | | | | Property of Thermoplastic Resin Composition | |
|---|---|---|---|---|---|---|---|---|
| | Styrene resin | | Vinyl chloride resin | | Olefin polymer | | Izod impact strength (kg × cm/cm) | Tensile strength (kg/cm$^2$) |
| | A1 | A2 | B1 | B2 | C1 | C2* | | |
| Example 1 | 50 | | | | 50 | | 10.2 | 460 |
| 2 | | 50 | | | 50 | | 5.3 | 480 |
| 3 | | | 50 | | 50 | | 5.5 | 490 |
| 4 | | 25 | | 25 | 50 | | 10.4 | 450 |
| 5 | 90 | | | | 10 | | 10.1 | 460 |
| Comparative Example 1 | 50 | | | | | 50 | 4.0 | 303 |
| 2 | | 50 | | | | 50 | 3.7 | 355 |
| 3 | | | 50 | | | 50 | 3.8 | 374 |
| 4 | | 25 | | 25 | | 50 | 5.2 | 311 |
| 5 | 90 | | | | | 10 | 6.0 | 357 |

The following are the method of reduced viscosity measurement and the method of sample solution preparation, both for the styrene resins used in the examples.

Reduced Viscosity

A styrene resin was dissolved in N,N-dimethylformamide to prepare a styrene resin solution having a styrene resin concentration of 0.3 g/dl. In accordance with JIS-K6721, the resin solution was subjected to a viscosity measurement with an Ubbelohde's viscometer (automatic capillary viscometer, manufactured by Shibayama Kagaku-Kiki Seisakusho K.K., Japan) at 30° C. to measure the falling down time (t). On the other hand, the falling down time (t$_0$) for the solvent, N,N-dimethylformamide, was also measured at 30° C. with the same apparatus. From the t and t$_0$ values obtained, the reduced viscosity ($\eta_{red}$) of the resin was calculated using the equation:

$$\eta_{red} = (t/t_0 - 1)/C$$

where C is the concentration (g/dl) of the resin solution. (Preparation of Methyl Ethyl Ketone Solution of the Methyl Ethyl Ketone-Soluble Part of Styrene Resin)

0.5 Gram of a styrene resin was immersed in 20 ml of methyl ethyl ketone at 23° C. for 24 hours, thereby allowing the resin to swell. Thereafter, the resulting mixture was stirred for 1 hour with a magnetic stirrer to dissolve or disperse the resin. This dispersion was centrifuged at 12° C. for 1 hour using a centrifugal separator (PR-70T, manufactured by Hitachi Ltd., Japan) at 30,000 rpm, and the supernatant was then taken out with a pipette. Subsequently, methyl ethyl ketone was added to the residue in an amount equal to the amount of the supernatant taken out, and centrifugal separation was conducted under the same conditions as the above.

Thereafter, methyl ethyl ketone was added to the residue in an amount equal to the amount of the supernatant taken out, and centrifugal separation was conducted again under the same conditions as the above.

The three supernatants thus obtained were added together, thus giving a methyl ethyl ketone solution of the methyl ethyl ketone-soluble part of the styrene resin.

Each of the pelletized thermoplastic resin compositions prepared in Examples 1 to 5 and Comparative Examples 1 to 5 was formed into test pieces using a 5-ounce injection-molding machine. During the injection molding, the nozzle temperature was regulated at 250° C. for Examples 1 and 5 and Comparative Examples 1 and 5 and at 190° C. for Examples 2 to 4 and Comparative Examples 2 to 4.

The test pieces thus obtained were evaluated for impact strength and tensile strength by the following methods. The results obtained are summarized in Table 3.

Impact Strength:

Measurement was made by an Izod impact test in accordance with ASTM D-256.

Tensile Strength:

Measurement was made by a tensile strength test in accordance with ASTM D-638.

The results in Table 3 show that the thermoplastic resin compositions of the present invention were excellent in both Izod impact strength and tensile strength.

While the invention has been described in detail and with reference to specific embodiments thereof, it will be apparent to one skilled in the art that various changes and modifications can be made therein without departing from the spirit and scope thereof.

What is claimed is:

1. A thermoplastic resin composition comprising from 5 to 98 parts by weight of a styrene resin (A) and/or a vinyl chloride resin (B) and from 95 to 2 parts by weight of a modified olefin polymer (C) having, per from 2 to 1,000 olefin-derived repeating units, one structural unit containing at least one amido group (a) and at least one reactive group (b) selected from the group consisting of glycidyloxy group and glycidyl group.

2. A thermoplastic resin composition as claimed in claim 1, wherein said modified olefin polymer (C) is an olefin resin modified with a compound represented by general formula (I)

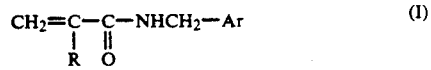

wherein Ar represents a C$_6$-C$_{23}$ aromatic hydrocarbon group having at least one reactive group selected from the group consisting of glycidyloxy group and glycidyl group, and R represents hydrogen atom or methyl group.

3. A thermoplastic resin composition as claimed in claim 1, wherein said styrene resin (A) is one whose methyl ethyl ketone-soluble part has a reduced viscosity of from 0.2 to 1.2 dl/g.

4. A thermoplastic resin composition as claimed in any one of claims 1 to 3, wherein said styrene resin (A) comprises a styrene copolymer containing a monomer unit derived from a compound selected from the group consisting of a vinyl cyanide compound and an alkyl methacrylate compound.

5. A thermoplastic resin composition as claimed in any one of claims 1 to 3, wherein said styrene resin (A) comprises a styrene copolymer containing from 10 to 60% by weight of a monomer unit, based on the weight of said styrene resin (A), derived from a compound selected from the group consisting of a vinyl cyanide compound and an alkyl methacrylate compound.

6. A thermoplastic resin composition as claimed in claim 1 or 3, wherein said styrene resin (A) contains from 0 to 70 parts by weight of a graft copolymer, per 100 parts by weight of said styrene resin (A), obtained by polymerizing from 40 to 90% by weight of a rubbery polymer with from 60 to 10% by weight of a mixture of at least one compound selected from the group consisting of a vinyl cyanide compound, an aromatic vinyl compound, and an alkyl methacrylate and a monomer other than said compound which is copolymerizable with said at least one compound.

7. A thermoplastic resin composition as claimed in claim 1, wherein said vinyl chloride resin (B) has a polymerization degree of from 400 to 2,000.

8. A thermoplastic resin composition as claimed in claim 1, wherein the proportion of said styrene resin (A) to said vinyl chloride resin (B) is from 10/90 to 90/10 by weight.

* * * * *